United States Patent
Lin

(10) Patent No.: US 8,914,657 B2
(45) Date of Patent: Dec. 16, 2014

(54) MOBILE DEVICE CHIP AND MOBILE DEVICE CONTROLLING METHOD THEREFOR

(75) Inventor: Chih-Ping Lin, Wandan Township, Pingtung County (TW)

(73) Assignee: Mediatek Inc., Hsin-Chu (TW)

( * ) Notice: Subject to any disclaimer, the term of this patent is extended or adjusted under 35 U.S.C. 154(b) by 550 days.

(21) Appl. No.: 13/275,528

(22) Filed: Oct. 18, 2011

(65) Prior Publication Data

US 2013/0097442 A1 Apr. 18, 2013

(51) Int. Cl.
*G06F 1/26* (2006.01)
*G06F 1/32* (2006.01)
*G06F 13/28* (2006.01)

(52) U.S. Cl.
CPC ............ *G06F 13/28* (2013.01); *G06F 1/324* (2013.01); *G06F 1/3287* (2013.01); *G06F 1/3293* (2013.01)
USPC ............ 713/322; 713/300; 713/320; 710/22

(58) Field of Classification Search
USPC .............................. 713/300, 320, 322; 710/22
See application file for complete search history.

(56) References Cited

U.S. PATENT DOCUMENTS

2008/0235526 A1* 9/2008 Lee ............................... 713/320
2011/0314185 A1* 12/2011 Conroy et al. ................. 710/22

* cited by examiner

*Primary Examiner* — Michael J Brown
(74) *Attorney, Agent, or Firm* — McClure, Qualey & Rodack, LLP

(57) ABSTRACT

A mobile device chip is provided. The mobile device chip includes a main processor, a multimedia processor, and a direct memory access (DMA) circuit. The multimedia processor is electrically coupled to the main processor. The DMA circuit accesses storage, and the DMA circuit is electrically coupled to the multimedia processor. When the mobile device chip operates in a normal mode, the main processor provides file accessing information of at least part of an audio file stored in the storage to the multimedia processor. When the mobile device chip operates in a power-saving mode, the multimedia processor obtains the data of the at least part of the audio file stored in the storage through the DMA circuit according to the file accessing information provided by the main processor.

20 Claims, 6 Drawing Sheets

| Entry | Sector index | PST |
|---|---|---|
| 1 | Sector 1 | Start Sector index = 1 |
| 2 | Sector 2 | Length = 3 |
| 3 | Sector 3 | Start Sector index = 310 |
| 4 | Sector 310 | Length = 7 |
| 5 | Sector 311 | Start Sector index = 10 |
| 6 | Sector 312 | Length = 2 |
| 7 | Sector 313 | |
| 8 | Sector 314 | |
| 9 | Sector 315 | |
| 10 | Sector 316 | |
| 11 | Sector 10 | |
| 12 | Sector 11 | |

MOBILE DEVICE CHIP AND MOBILE DEVICE CONTROLLING METHOD THEREFOR

BACKGROUND OF THE INVENTION

1. Field of the Invention

The invention relates in general to the device chip and device controlling method, and more particularly to a mobile device chip and mobile device controlling method.

2. Description of the Related Art

Mobile phones play an important role in people's daily life. For current and next generation of mobile phones, there is a strong demand for reducing the power consumption and making the mobile phones more energy-efficient to maximize operating lifetime under a limited battery power supply.

To reduce the power used in audio playback is one way to reduce the power consumption of the mobile phones. For this purpose, some mobile phones are implemented to have an additional multimedia chip in addition to the mobile device chip, and some mobile phones try to improve their power management without additional multimedia processor.

In regard to the first way, although adding another multimedia chip would reduce the power consumption, the cost of the mobile phone is highly increased. In the second way, system loading, running tasks and running process will be detected to manage clock signals and turn on/off relative hardware. However, the reduced power consumption is very small in the second way and the power wastage is still very considerable because of the basic power overhead. Therefore, how to find an efficient way to reduce the power consumption is an important issue to the mobile phones.

SUMMARY OF THE INVENTION

The invention is directed to a mobile device chip and mobile device controlling method for a mobile device, resulting in reducing the power usage while performing audio playing or audio playback in the mobile device. Therefore, the power consumption is reduced and high energy efficiency is achieved to maximize the operating time under the limited battery power supply for the mobile device.

According to an aspect of the present invention, a mobile device chip is provided. The mobile device chip includes a main processor, a multimedia processor and a direct memory access (DMA) circuit. The multimedia processor is electrically coupled to the main processor. The DMA circuit accesses storage, and the DMA circuit is electrically coupled to the multimedia processor. When the mobile device chip operates in a normal mode, the main processor provides file accessing information of at least part of an audio file stored in the storage to the multimedia processor. When the mobile device chip operates in a power-saving mode, the multimedia processor obtains the data of the at least part of the audio file stored in the storage through the DMA circuit according to the file accessing information provided by the main processor.

According to another aspect of the present invention, a mobile device controlling method is provided. The mobile device controlling method includes the following steps. A mobile device chip comprising a main processor, a multimedia processor, and a direct memory access (DMA) circuit is applied. The multimedia processor is electrically coupled to the main processor, and the DMA circuit accesses storage and is electrically coupled to the multimedia processor. File accessing information of at least part of an audio file stored in the storage is provided to the multimedia processor by the main processor when the mobile device chip operates in a normal mode. The data of the at least part of the audio file stored in the storage is obtained through the DMA circuit according to the file accessing information provided by the main processor by the multimedia processor when the mobile device chip operates in a power-saving mode.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
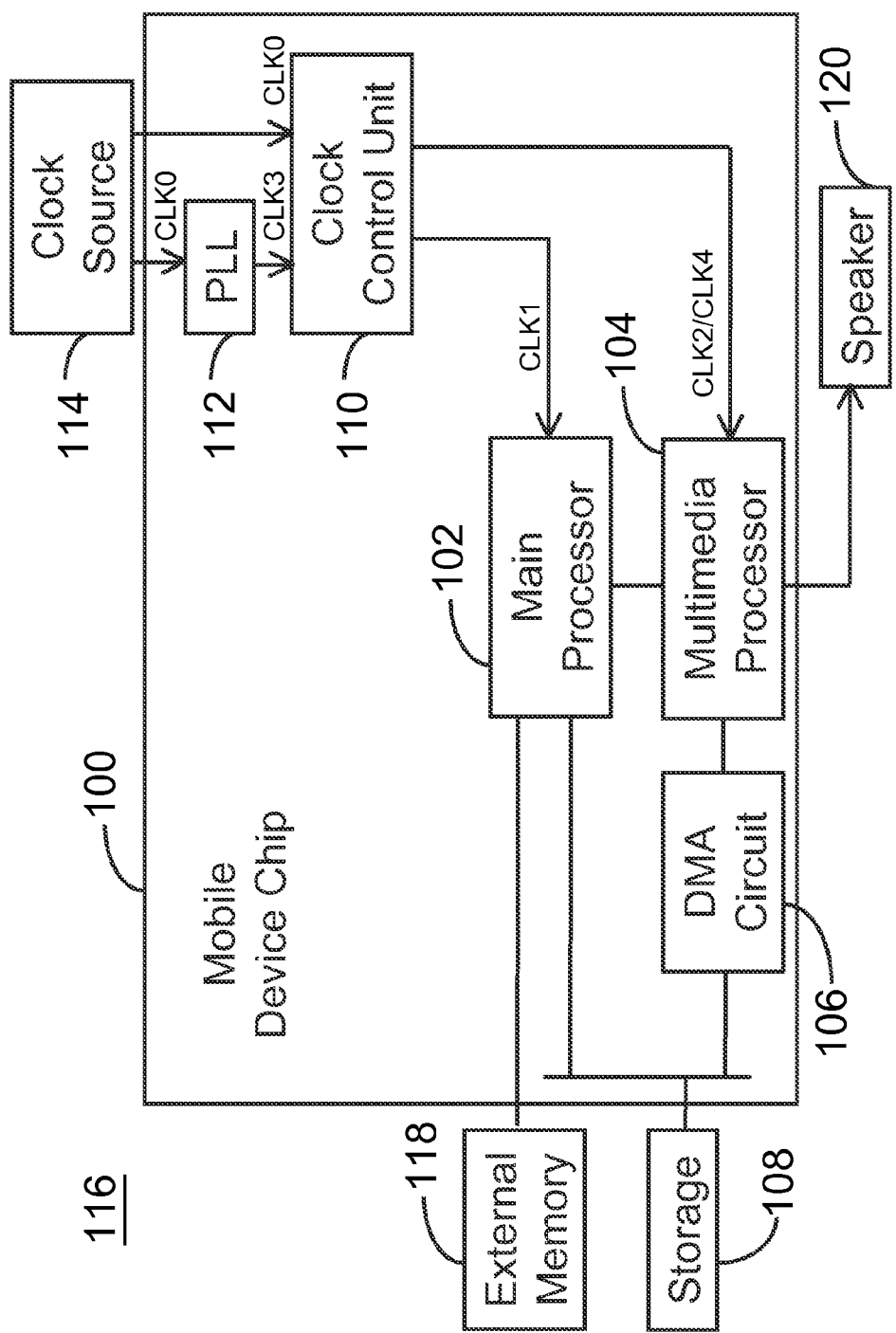
FIG. 1 shows a block diagram of a mobile device chip according to an embodiment of the invention.

Referring to FIG. 1, a block diagram of a mobile device chip 100 according to an embodiment of the invention is shown. The mobile device chip 100 includes a main processor 102, a multimedia processor 104, and a direct memory access (DMA) circuit 106. The multimedia processor 104 is electrically coupled to the main processor 102. The DMA circuit 106 accesses storage 108, and the DMA circuit 106 is electrically coupled to the multimedia processor 104.

When the mobile device chip 100 operates in a normal mode, the main processor 102 provides file accessing information of at least part of an audio file stored in the storage 108 to the multimedia processor 104. When the mobile device chip 100 operates in a power-saving mode, the multimedia processor 104 obtains the data of the at least part of the audio file stored in the storage 108 through the DMA circuit 106 according to the file accessing information provided by the main processor 102.

In order to reduce the power consumption, the mobile device chip 100 operates in the power-saving mode when only audio task is to be served, for example. That is, if only audio task is to be served, the mobile device chip 100 can operates in the power-saving mode to reduce the power usage while performing audio playing or audio playback in a mobile device. Therefore, the power consumption is reduced and high energy efficiency is achieved to maximize the operating time under the limited battery power supply for the mobile device.

Furthermore, the mobile device chip 100 can further includes a clock control unit 110 and a phase locked loop (PLL) 112. The clock control unit 110 controls the PLL 112 and the clock control unit 110 is electrically connected to the main processor 102 and the multimedia processor 104.

When the mobile device chip 100 operates in the normal mode, the PLL 112 is activated and the clock control unit 110 provides a first clock signal CLK1 and a second clock signal CLK2 to the main processor 102 and the multimedia processor 104, respectively, based on a third clock signal CLK3 generated by the PLL 112. When the mobile device chip 100 operates in the power-saving mode, the main processor 102 enters a sleep mode and the PLL 112 is non-activated, and the clock control unit 110 provides a fourth clock signal CLK4 to the multimedia processor 104 whose frequency is lower than the frequency of the second clock signal CLK2.

When the mobile device chip 100 operates in the normal mode, the PLL 112 generates the third clock signal CLK3 according to the reference clock signal CLK0 from a clock source 114. The frequency of the third clock signal CLK3 is usually higher than the frequency of the reference clock signal CLK0. Thus, the frequencies of the first clock signal CLK1 and a second clock signal CLK2 for the main processor 102 and the multimedia processor 104, respectively, are usually higher than the reference clock signal CLK0. When the mobile device chip 100 operates in the power-saving mode, the PLL 112 is non-activated, and the clock control unit 110 outputs the fourth clock signal CLK4 to the multimedia processor 104 according to the reference clock signal CLK0 from the clock source 114. Since the main processor 102 enters the sleep mode, no clock signal is needed for the main processor 102.

The main processor 102 can be implemented by microcontroller unit (MCU), for example, and the multimedia processor 104 can be implemented by a digital signal processor (DSP). When the mobile device chip 100 operates in the normal mode, the main processor 102 handles the operations of communication and user interface of the mobile device 116. Usually, the design of the multimedia processor 104 is simpler than that of the main processor 102. When the mobile device chip 100 operates in the normal mode, the multimedia processor 104 completes the operation of audio playing or audio playback with the assistance of the main processor 102. In some embodiments, the multimedia processor 104 can also perform the operation of non-audio task if necessary. For example, the main processor 102 accesses data of an audio file from the storage 108 and transfers the data to the external memory 118. After that, the data of the audio file is transferred from the external memory 118 to an internal memory 310 (shown in FIG. 3 of the mobile device chip 100). The multimedia processor 104 will read the internal memory 310 to obtain the data of the audio file to decode the data of the audio file. The decoded data is then outputted to the speaker 120 for playing.

Besides, when the mobile device chip 100 operates in the power-saving mode, the multimedia processor 104 obtains the data of the at least part of the audio file stored in the storage 108 through the DMA circuit 106 according to the file accessing information provided by the main processor 102 before the main processor 102 enters the sleep mode. With the file accessing information previous obtained from the main processor 102 before the main processor 102 enters the sleep mode, the multimedia processor 104 can obtains the data of the audio file from the storage 108 through the DMA circuit 106 without the assistance of the main processor 102. The operation of audio playing or audio playback can be performed by the multimedia processor 104 only, and the clock signal of low frequency is enough for the multimedia processor 104 to perform audio playing or audio playback. Therefore, the clock signal CLK4 with lower frequency is provided to the multimedia processor 104 instead of the clock signal CLK2 when the mobile device chip 100 operates in the power-saving mode, which can efficiently reduce the power consumption of the mobile device 116.

Figure 2:
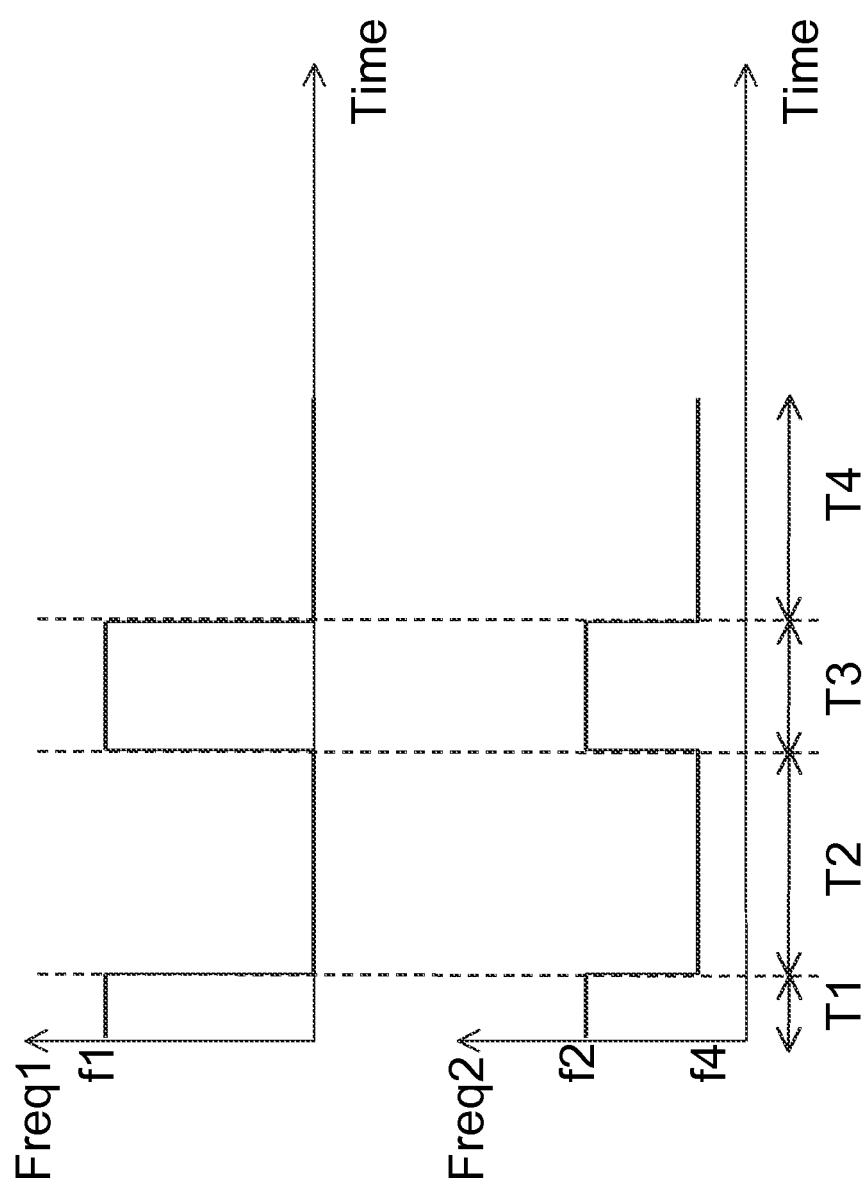
FIG. 2 shows the frequency of the clock signal inputted to the main processor and the frequency of the clock signal inputted to the multimedia processor when the mobile device chip operates in the normal mode and the power-saving mode.

Referring to FIG. 2, the frequency Freq1 of the clock signal inputted to the main processor 102 and the frequency Freq2 of the clock signal inputted to the multimedia processor 104 when the mobile device chip 100 operates in the normal mode and the power-saving mode is shown. During time periods T1 and T3, for example, the mobile device chip 100 operates in the normal mode; the main processor 102 receives the first clock signal CLK1 whose frequency is f1, while the multimedia processor 104 receives the second clock signal CLK2 whose frequency is f2. The PLL 112 is activated during time periods T1 and T3. During time periods T2 and T4, for example, the mobile device chip 100 operates in the power-saving mode, the main processor 102 enters sleep mode and no clock signal is needed, while the multimedia processor 104 receives the fourth clock signal CLK4 whose frequency is f4, which is lower than the frequency f2 of the second clock signal CLK2. The PLL 112 is non-activated during time periods T2 and T4. Because the main processor 102 is in sleep mode, the PLL 112 is non-activated, and the frequency of clock signal needed for the multimedia processor 104 is lowered, the power consumption is considerably reduced during time periods T2 and T4 when the mobile device chip 100 operates in the power-saving mode.

The file accessing information provided by the main processor 102 includes a physical sector table (PST), for example, which carries a number of PST entries, each PST entry catalogs the physical address of one block data in the storage. When the amount of PST entries is below a first threshold and when the mobile device chip 100 operates in the power-saving mode, the multimedia processor 104 will wake up the main processor 102 and the mobile device chip 100 is changed to operate in the normal mode to make the main processor 102 provide the file accessing information to the multimedia processor 104 again. The threshold can be, for example, one-tenth of total amount of PST entries. The threshold can also be set to other value according to the speed in which the main processor 102 generates a new PST entry and the speed in which the main processor 102 transfers the PST entries to the multimedia processor 104.

Figure 3:
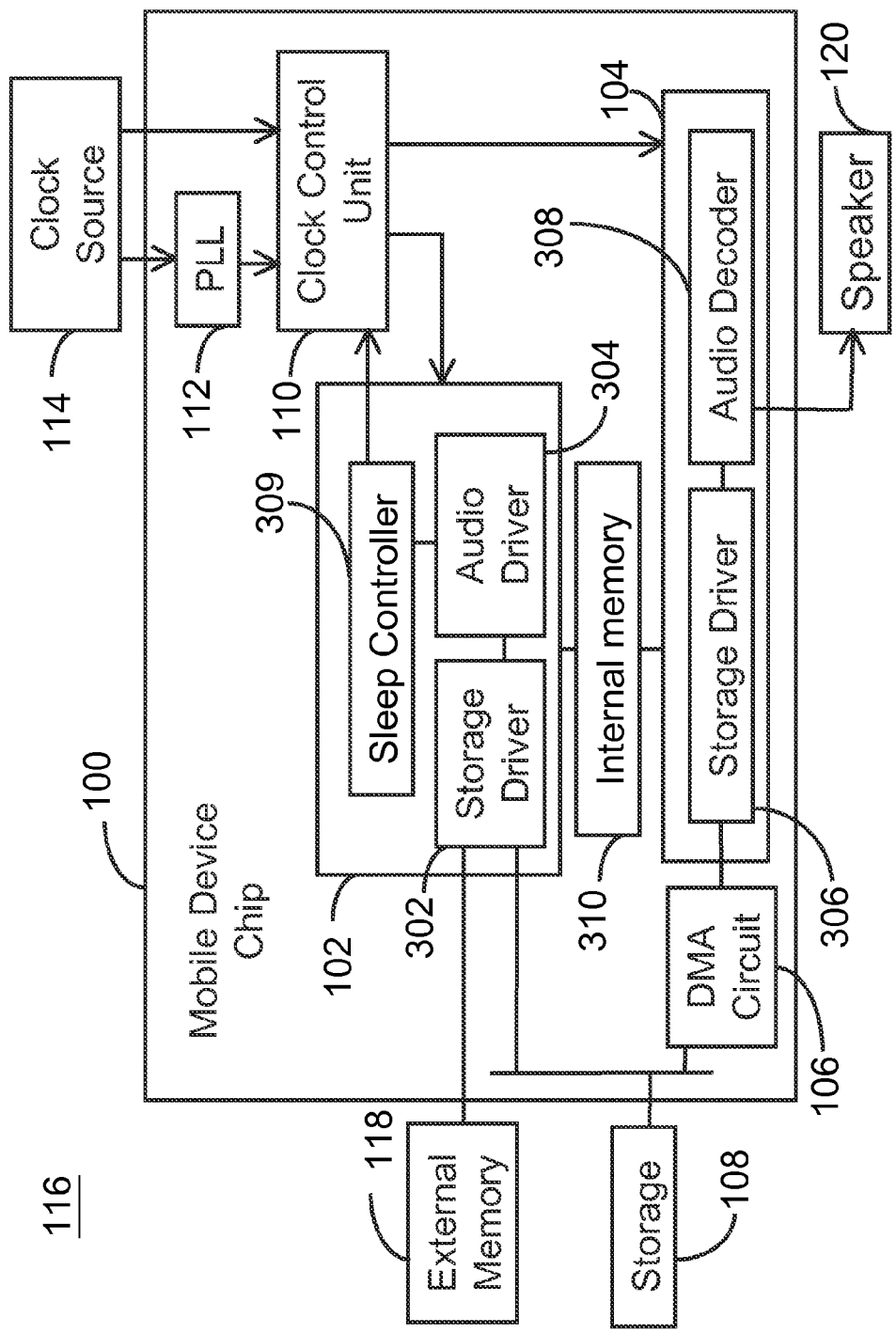
FIG. 3 shows an example of the main processor and the multimedia processor.

Referring to FIG. 3, an example of the main processor 102 and the multimedia processor 104 is shown. The main processor 102 includes a storage driver 302 and an audio driver 304. The storage driver 302 manages the storage 108. The audio driver 304 manages audio playing tasks or audio playback tasks in the main processor 102 when the mobile device chip 100 operates in the normal mode. The audio driver 304 further detects if any non-audio tasks use the storage driver 302. If no, the audio driver 304 gets the file accessing information from the storage driver 302, transfers the file accessing information to the multimedia processor 104, and informs the sleep controller 309. The sleep controller 309 checks if only audio task is operated. If yes, the sleep controller 309 sets the mobile device chip 100 to the power-saving mode.

The multimedia processor 104 includes a storage driver 306 and an audio decoder 308, for example. The storage driver 306 is responsible to read operation of the storage 108 when the mobile device chip 100 is in the power-saving mode. The audio decoder 308 decodes data from the audio driver 304 when the mobile device chip 100 is in the normal mode. The audio decoder 308 decodes data from the storage driver 306 when the mobile device chip 100 is in the power-saving mode. The decoded data is outputted from the audio decoder 308 to the speaker 120 for playing. In one example, the storage driver 306 is a simplified storage driver which is only responsible to read operation of the storage 108 when the mobile device chip 100 is in the power-saving mode.

The mobile device chip 100 can further includes an internal memory 310. The storage driver 306 reads the storage 108 according to the file accessing information and stores the read data from the storage 108 into the internal memory 310, and the audio decoder 308 decodes the data stored in the internal memory 310. When the data stored in the internal memory 310 is blow a second threshold, the storage driver 306 reads the storage 108 again according to the file accessing information and stores the read data to the internal memory 310 again. The second threshold, for example, corresponds to the amount of audio data which is double of the amount of audio data decoded by the audio decoder 308 per time unit, or corresponds to the amount of decoded data for the speaker 120 to play for a particular time period, for example, 50 milliseconds.

Figure 4:
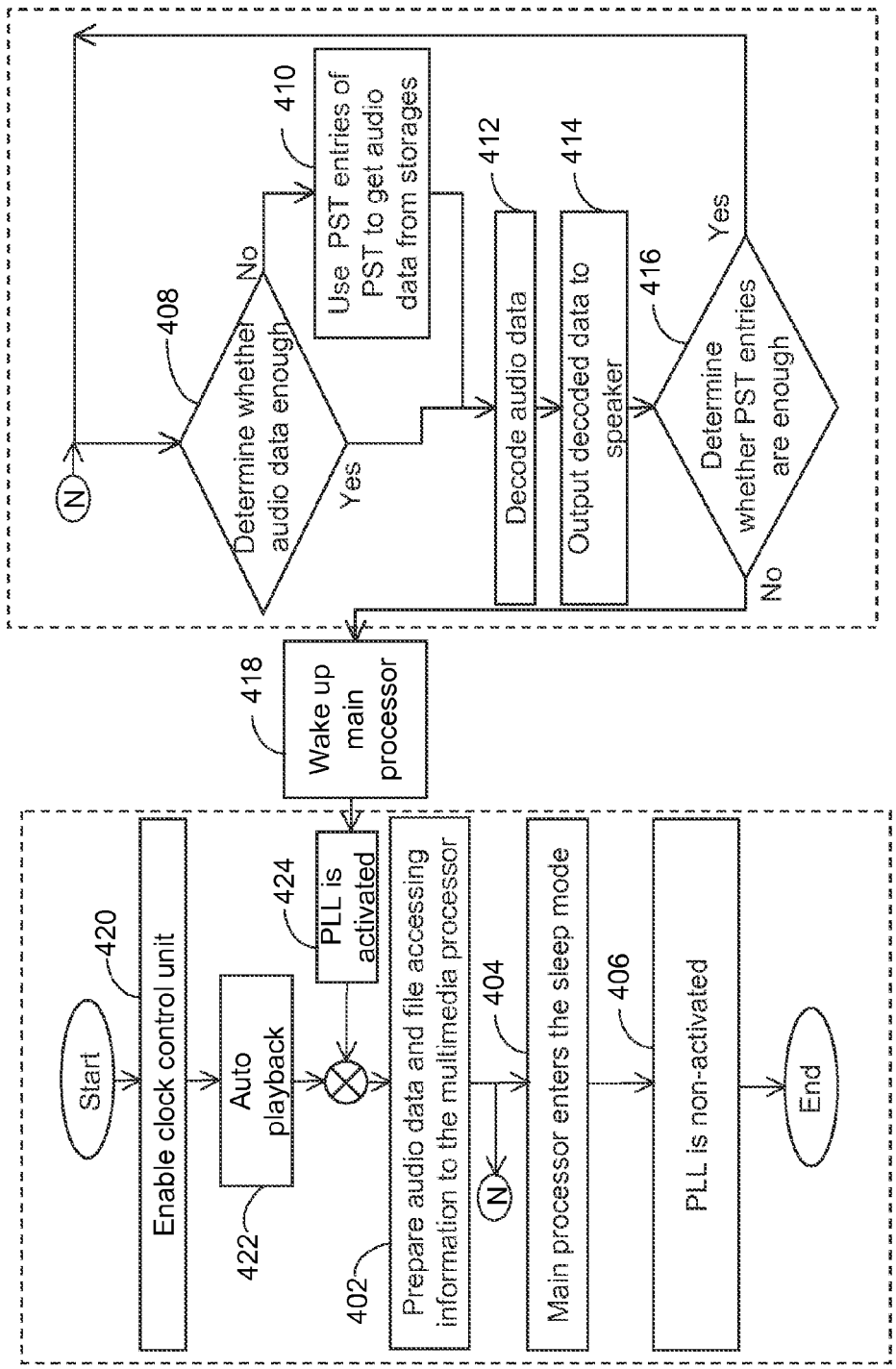
FIG. 4 shows the flow chart of the mobile device controlling method when only audio task is performed according to an embodiment of the invention.

Referring to FIG. 4, the flow chart of the mobile device controlling method when only audio task is performed according to an embodiment of the invention is shown. In step 420, the audio driver 304 enables the clock control unit 110. Then, in step 422, the audio driver 304 starts audio playback. In step 402, the audio driver 304 prepares audio data, the storage driver 302 prepares the file accessing information (for example, PST), and the audio driver 304 transfers the file accessing information to the multimedia processor 104. After that, steps 404 and 408 are entered. In step 404, the main processor 102 enters the sleep mode, and then the PLL 112 is non-activated (for example, powered off) and no clock signal is inputted to the main processor 102 in step 406.

In step 408, it is determined that whether the audio data stored in the internal memory 310 for audio playing or audio playback is enough. If not, step 410 is performed; if yes, step 412 is performed. In step 410, the storage driver 306 uses the file accessing information (for example, the PST entries of PST) to get more audio data from the storage 108 through the DMA circuit 106, and stores the audio data in the internal memory 310. In step 412, the audio decoder 308 reads the audio data in the internal memory 310 and decodes the audio data. For example, the audio data is decoded to a pulse-code modulation (PCM) data. After that, the decoded data is outputted to the speaker 120 in step 414, followed by step 416, in which it is determined that whether the file accessing information (for example, the PST entries) is enough. If yes, step 408 is repeated; if not, step 418 is performed to wake up the main processor 102, and then step 424 is performed so that the PLL 112 is activated. After that, step 402 is performed again to get more file accessing information (for example, get more PST entries). In the flow chart of FIG. 4, steps 402, 404, 406, 420, 422, and 424 are performed by the main processor 102, and steps 408, 410, 412, 414, and 416 are performed by the multimedia processor 104.

Figure 5:
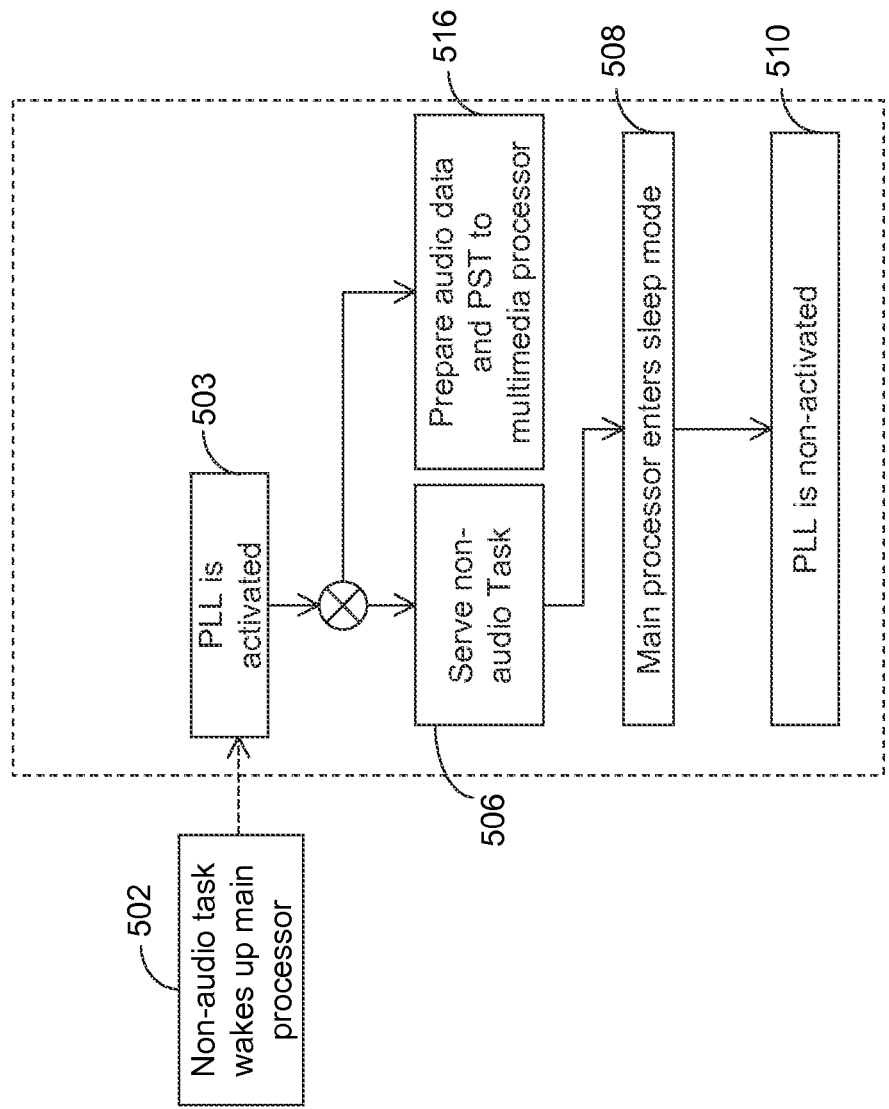
FIG. 5 shows the flow chart of the mobile device controlling method when non-audio task is performed according to an embodiment of the invention.

Referring to FIG. 5, the flow chart of the mobile device controlling method when non-audio task is performed according to an embodiment of the invention is shown. As shown in step 502, when there is a non-audio task to be performed, the main processor 102 is waked up. After that, as shown in step 503, the PLL 112 is also activated. Then, the main processor 102 serves the non-audio task in step 506. After the non-audio task is finished, the main processor 102 enters the sleep mode in step 508, and the PLL 112 is non-activated in step 510.

After step 503, step 516 is also performed by the main processor 102. The main processor 102 prepares the audio data and the file accessing information (for example, the PST) to the multimedia processor 104 so that the multimedia processor 104 can decode the audio data or obtain more audio data from the storage 108 when the main processor 102 is in the sleep mode to reduce the power consumption.

Figures 6, 7:
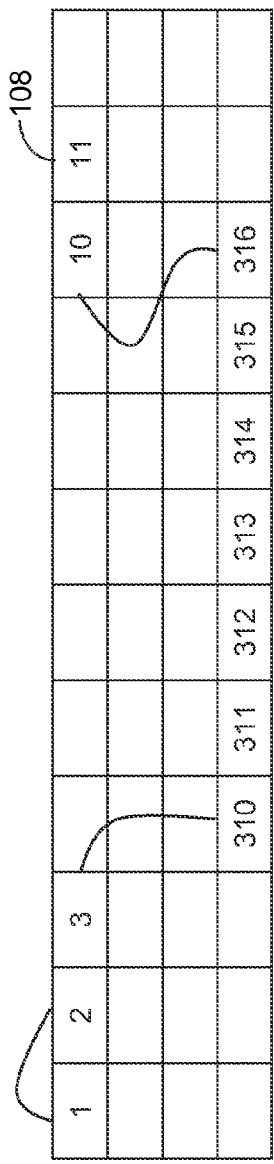
FIG. 6 shows an example of the sections of storage which stores the audio data of the audio file.
FIG. 7 shows an example of PST.

Referring to FIG. 6 and FIG. 7, FIG. 6 shows an example of the sections of storage 108 which stores the audio data of the audio file, and FIG. 7 shows an example of PST. Assume that sectors 1, 2, 3, 10, 11, and 310-316 of the storage 108 stores the audio data of at least part of the audio file which is going to be played or playback. The storage driver 302 gets the sector index for the audio data of the audio file (as shown in the column "Sector Index" in FIG. 7), and the storage driver 302 generates the PST accordingly (as shown in the column "PST" in FIG. 7). The PST is then transferred to the multimedia processor 104 for reading audio data from the storage 108 through the DMA circuit 106.

The mobile device chip 100 of the embodiment is implemented for mobile communication devices, for example, mobile phones, personal digital assistants (PDA), tablets, handheld computers, handheld game consoles, and so on. The storage driver 302, the audio driver 304, the storage driver 306, and the audio decoder 308 can be implemented by hardware or software. In this embodiment of the invention, with the use of the DMA circuit 106 and the file accessing information (for example, PST), audio data in the storage 108 can be accessed by the multimedia processor 104 and put in the internal memory 310 directly to be decoded by the multimedia processor 104. When audio playing or audio playback, the main processor 102 can enter sleep mode, the external memory 118 can be powered down, the PLL 112 can be non-activated, and the frequency of the clock signal for the multi-media processor 104 can be reduced to the working clock frequency of the audio decoder 308. Comparing to the conventional mobile devices which are implemented to have a separated multimedia chip in addition to the mobile device chip, it is not necessary to have an additional and separated multimedia chip for this embodiment of the invention, which reduces the cost of the mobile device. Therefore, in this embodiment of the invention, the power usage while performing audio playing or audio playback in the mobile device of this embodiment is lowered, the power consumption is reduced, and high energy efficiency is achieved to maximize the operating time under the limited battery power supply for the mobile device with low cost.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile device chip, comprising:
a main processor;
a multimedia processor, electrically coupled to the main processor; and
a direct memory access (DMA) circuit, for accessing a storage, the DMA circuit being electrically coupled to the multimedia processor;
wherein when the main processor operates in a normal mode, the main processor provides file accessing information of at least part of an audio file stored in the storage to the multimedia processor;
wherein when the main processor and the multimedia processor operate in a power-saving mode, the multimedia processor obtains the data of the at least part of the audio file stored in the storage through the DMA circuit according to the file accessing information provided by the main processor.

2. The mobile device chip according to claim 1, wherein when only audio task is to be served, and the main processor and the multimedia processor operate in the power-saving mode.

3. The mobile device chip according to claim 1, further comprising a clock control unit and a phase locked loop (PLL), the clock control unit controlling the PLL and electrically connected to the main processor and the multimedia processor,
wherein when the main processor operates in the normal mode, the PLL is activated and the clock control unit provides a first clock signal and a second clock signal to the main processor and the multimedia processor, respectively, based on a third clock signal generated by the PLL;
wherein when the main processor and the multimedia processor operate in the power-saving mode, the main processor enters a sleep mode and the PLL is non-activated, and the clock control unit provides a fourth clock signal to the multimedia processor whose frequency is lower than the frequency of the second clock signal, based on the reference clock signal.

4. The mobile device chip according to claim 1, wherein the file accessing information comprising a physical sector table (PST) which carrying a plurality of PST entries, each PST entry catalogs the physical address of one block data in the storage.

5. The mobile device chip according to claim 4, wherein when the amount of PST entries is below a first threshold when the main processor and the multimedia processor operate in the power-saving mode, the main processor is changed to operate in the normal mode to make the main processor provide the file accessing information to the multimedia processor again.

6. The mobile device chip according to claim 1, wherein the main processor comprises:
a sleep controller;
a first storage driver, for managing the storage; and
an audio driver, for managing audio playing tasks or audio playback tasks in the main processor when the main processor operates in the normal mode,
wherein the audio driver further detects if any non-audio tasks is to be executed, if no, the audio driver gets the file accessing information from the first storage driver, transfers the file accessing information to the multimedia processor, and informs the sleep controller to set the main processor and the multimedia processor to the power-saving mode.

7. The mobile device chip according to claim 6, wherein the multimedia processor comprises:
a second storage driver, for being responsible to read operation of the storage when the main processor and the multimedia processor is in the power-saving mode; and
an audio decoder, for decoding data from the audio driver when the main processor is in the normal mode, and decoding data from the second storage driver when the main processor and the multimedia processor is in the power-saving mode, wherein the decoded data is outputted to a speaker for playing.

8. The mobile device chip according to claim 7, wherein the second storage driver is only for being responsible to read operation of the storage when the main processor and the multimedia processor is in the power-saving mode.

9. The mobile device chip according to claim 7, wherein the mobile device chip further comprising an internal memory, the second storage driver reads the storage according to the file accessing information and stores the read data from the storage into the internal memory, and the audio decoder decodes the data stored in the internal memory when the main processor and the multimedia processor is in the power-saving mode,
wherein when the data stored in the internal memory is blow a second threshold, the second storage driver reads the storage again according to the file accessing information and stores the read data to the internal memory again.

10. The mobile device chip according to claim 1, wherein the mobile device chip is implemented for mobile communications devices.

11. The mobile device chip according to claim 1, further comprising a clock control unit and a phase locked loop (PLL), the clock control unit controlling the PLL and electrically connected to the main processor and the multimedia processor,
wherein when the main processor operates in the normal mode, the PLL is activated and the clock control unit provides a first clock signal and a second clock signal to the main processor and the multimedia processor, respectively, based on a third clock signal generated by the PLL;
wherein when the main processor and the multimedia processor operate in the power-saving mode, the main processor enters a sleep mode and the PLL is non-activated, and the clock control unit provides a fourth clock signal to the multimedia processor whose frequency is lower than the frequency of the second clock signal, based on the reference clock signal.

12. A mobile device controlling method, for a mobile device chip comprised a main processor, a multimedia processor, and a direct memory access (DMA) circuit; the multimedia processor being electrically coupled to the main processor, the DMA circuit accessing a storage and being electrically coupled to the multimedia processor; the method comprising:
providing file accessing information of at least part of an audio file stored in the storage to the multimedia processor by the main processor when the main processor operates in a normal mode; and
obtaining the data of the at least part of the audio file stored in the storage through the DMA circuit according to the file accessing information by the multimedia processor when the main processor and the multimedia processor operate in a power-saving mode.

13. The mobile device controlling method according to claim 12, wherein when no non-audio task is to be served, the main processor and the multimedia processor operate in the power-saving mode.

14. The mobile device controlling method according to claim 12, wherein the file accessing information comprising a PST which carrying a plurality of PST entries, each PST entry catalogs the physical address of one block data in the storage.

15. The mobile device controlling method according to claim 14, wherein when the amount of PST entries is below a first threshold and when the main processor and the multimedia processor operate in the power-saving mode, the main processor is changed to operate in the normal mode to make the main processor provide the file accessing information to the multimedia processor again.

16. The mobile device controlling method according to claim 12, wherein the main processor comprises a first storage driver, for managing the storage, and an audio driver, for managing audio playback tasks in the main processor when the main processor operates in the normal mode, the main processor comprises a sleep controller, the method further comprises:

detecting if any non-audio tasks use the first storage driver by the audio driver, if no, getting the file accessing information from the first storage driver, transferring the file accessing information to the multimedia processor by the audio driver, and setting the main processor and the multimedia processor to the power-saving mode by the sleep controller.

17. The mobile device controlling method according to claim 16, wherein the multimedia processor comprises a second storage driver and an audio decoder, the second storage driver is being responsible to read operation of the storage when the main processor and the multimedia processor is in the power-saving mode, the method further comprising:

decoding data from the audio driver by the audio decoder when the main processor is in the normal mode, and decoding data from the second storage driver by the audio decoder when the main processor and the multimedia processor is in the power-saving mode, wherein the decoded data is outputted to a speaker for playing.

18. The mobile device controlling method according to claim 17, wherein the second storage driver is only for being responsible to read operation of the storage when the main processor and the multimedia processor is in the power-saving mode.

19. The mobile device controlling method according to claim 17, wherein the mobile device chip further comprising an internal memory, the method further comprising:

reading the storage according the file accessing information and storing the read data from the storage into the internal memory by the second storage driver;

decoding the data stored in the internal memory by the audio decoder when the main processor and the multimedia processor is in the power-saving mode, and when the data stored in the internal memory is below a second threshold, reading the storage again according the file accessing information and storing the read data to the internal memory again by the second storage driver.

20. The mobile device controlling method according to claim 12, wherein the mobile device controlling method is for mobile communications devices.

\* \* \* \* \*